United States Patent [19]

McDougal

[11] 4,266,421

[45] May 12, 1981

[54] VIBRATION SENSORS FOR INTERNAL COMBUSTION ENGINES

[76] Inventor: John A. McDougal, 14388 Harbor Island, Detroit, Mich. 48215

[21] Appl. No.: 67,991

[22] Filed: Aug. 20, 1979

[51] Int. Cl.³ .................. G01H 3/12; G01M 15/00; G01N 33/22

[52] U.S. Cl. .................................. 73/1 DV; 73/35

[58] Field of Search ............... 73/35, 1 DV, 116, 1 R; 123/119 ED, 117 R; 181/204, 233

[56] References Cited

U.S. PATENT DOCUMENTS

| | | | |
|---|---|---|---|
| 1,907,415 | 5/1933 | Carpenter et al. | 73/35 X |
| 2,164,638 | 7/1939 | Broeze et al. | 73/35 X |
| 2,233,804 | 3/1941 | Bourne | 181/233 |
| 2,403,774 | 7/1946 | Whitty et al. | 73/35 X |

*Primary Examiner*—James J. Gill
*Attorney, Agent, or Firm*—Harness, Dickey & Pierce

[57] ABSTRACT

Several embodiments and mountings of a vibration sensor are disclosed, all of which are suitable for detecting vibrations diagnostic of a combustion in a combustion chamber of a liquid cooled internal combustion engine. The channel for collection and transmission of these vibrations from the combustion chamber to the sensor in each embodiment includes the liquid engine coolant. In some of the embodiments, the sensor detects flexure of portions of the walls of the existing structure of the engine cooling system apart from the primary rigid structure of the engine. Dimensions of coolant system passages may be modified to tune or emphasize certain frequencies delivered to a sensor. To improve signal to noise ratio of the dignostic vibrations seen by the sensor, portions or extensions of the cooling system may be damped or silenced, or alternatively, damping or silencing may be applied to the entire cooling system. To the extent damping is applied, it additionally may result in reduced noise coupled to the atmosphere as occurs particularly via the large areas of the liquid to air heat exchanger surfaces.

24 Claims, 17 Drawing Figures

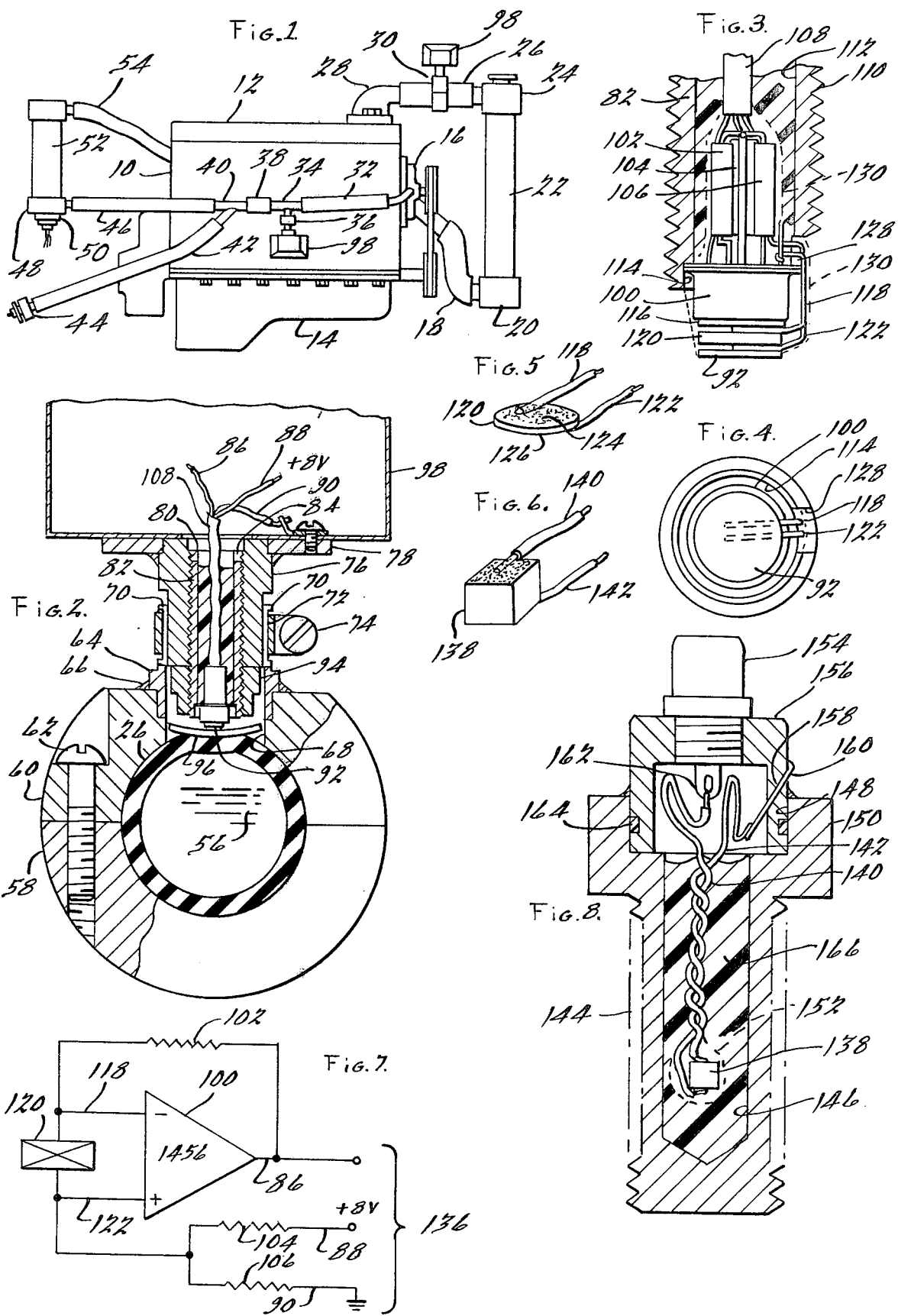

VIBRATION SENSORS FOR INTERNAL COMBUSTION ENGINES

BACKGROUND AND SUMMARY OF THE INVENTION

The present invention relates generally to vibration sensors and more particularly to vibration sensors adapted to detect vibrations which may originate from a combustion in a chamber of a liquid cooled internal combustion engine. One type of such vibration is commonly called knock, ping, or detonation. Generally, the signals sought are those resulting from and which are diagnostic of combustion phenomena.

One useful purpose for such a device is taught in applicant's U.S. Pat. No. 4,116,173, issued Sept. 26, 1978, entitled "Internal Combustion Engine Ignition System" and the disclosure of this earlier Patent is hereby incorporated in the present application by reference. According to principles taught in this earlier Patent, the output of a detonation sensor may be filtered and used to automatically and incrementally retard and advance the spark advance of a spark ignited engine, operating the combustion chambers by closed loop control to avoid objectionable detonation, yet at spark advance angles to obtain maximum energy from fuels of various octane ratings with which, from time to time, the engine may be supplied. This invention is particularly well suited to automotive vehicle applications where the engine is almost continuously subject to changes in speeds and loads.

Prior art detonation sensors suitable for this purpose divide generally into two groups.

First, there are those which measure combustion chamber gas pressure. These are commonly called pressure transducers or engine indicators, and may be capable of sensing the extremely rapid rise in pressure which is indicative of detonation in the combustion chamber in which they are installed.

The second group comprise sensors which are rigidly mounted to the engine cylinder head, block or manifold and which respond in some way to accelerations or vibrations of their specific mounting location. These are commonly called accelerometers.

The principal disadvantage of the combustion chamber pressure transducer approach is that one sensor is required for each combustion chamber resulting in excessive cost and complexity in the installation and wiring.

The second or accelerometer approach does not require a transducer for each combustion chamber as, from a single mounting location, the result of high intensity detonation may be heard from occurances in any cylinder of the engine. A further advantage of such a transducer is that it may be time shared so as to correctly attribute the result of a detonation in any of the several combustion chambers to the correct portion of the signal output stream from such a transducer; this was first taught in applicant's above mentioned Patent. The rigid metallic connection between the combustion chambers and the sensor produces extremely strong output signals in response to detonations. It is well known that the mounting location for such a sensor must be carefully selected as to produce roughly equal outputs from detonations in any of the several combustion chambers of a multi cylinder engine.

Generally, in closed loop detonation control systems which retard spark advance as a result of a sensor output, the system must make continual decisions that detonation has or has not occured. The ability of the system to discriminate between signals resulting from detonation and signals resulting from other sources as from vibrations from normal operation of the engine's mechanical valve train, is of prime importance. The more such a system can advance the spark timing without encountering objectionable detonation, the greater are the increases in fuel economy and engine power which can be obtained.

Too advanced a spark produces detonation which may be objectionable to the ears of a vehicle driver, results in a substantial loss in power output, and, if prolonged, can damage the engine.

It is well known that, if the sensitivity of such a system is set such that, say, valve train vibrations are occasionaly mistakenly accepted as indications of detonation, a "false retard" condition ensues and the excessively retarded spark may result in a loss of vehicle performance and fuel economy.

It is apparent to the applicant that the detonation sensing problem is that of detecting a signal in noise. The vibrations produced by an actual detonation of a charge are the signal sought, and must be found with a high degree of certainty even when these signal vibrations are intermingled with other vibrations which may have similar characteristics and which may arise from other sources or events.

Every location on the rigid structure of an engine block, cylinder head and manifold where an accelerometer type detonation sensor may be mounted carries a portion of the internally generated stresses incident to rotation and translation of engine parts as they carry out their normal functions. Due to the complexity of the rigid structure it seems reasonable to believe that every location carries a unique share of these vibratory stresses and that these stresses will vary under various engine operating conditions. Lack of uniformity in manufacturing processes, such as casting wall thicknesses also may produce differences in response at the same location for different engines of the same design.

In contrast to the individuality of noise characteristics of various mounting locations for detonation sensors on rigid structural parts of the engine, applicant has discovered that the sensing of detonation from a vantage point elastomericaly isolated from operating stresses of the engine rigid structure, yet hydraluically coupled to said structure, provides significant advantages as to distinguishing the desired signal from undesired noise. The cooling system of a liquid cooled internal combustion engine offers a number of such vantage points. The distributed nature of the cooling system throughout the engine cylinder head and block assures that all vibrations generated will be communicated to the liquid coolant. The efficient sound transmission through the coolant assures that these vibrations may be made available at substantial distances from the rigid engine structure. The large diaphragm like area of the cylinder head portion of the combustion chamber enclosure actually can flex, intruding slightly but suddenly into the coolant passages which are cast into the cylinder head and assures that the practically instantaneous step function resulting from detonation will be massively communicated to the engine coolant.

This invention provides an engine control system which senses the vibrations resulting from detonation from vantage points or locations associated with the cooling system of a liquid cooled internal combustion engine.

This invention provides an engine control system which senses vibrations having a characteristic which is diagnostic of a combustion of a charge in the combustion chamber of an internal combustion engine from a location isolated from and hydraulically coupled to the main rigid portion of the engine structure.

This invention provides an engine control system wherein the tuning of a signal to a sensor diagnostic of a combustion in the combustion chamber of an internal combustion engine to a particular frequency is accomplished by varying the length of a hydraulic passage.

This invention provides means to combine a detonation sensor with a portion of a liquid cooling system of an internal combustion engine to achieve advantages in sensing detonation and to effect economies in construction of the combined result.

This invention provides an engine control system in which the signal to noise ratio of the output from a vibration sensor for sensing vibrations diagnostic of a combustion in a combustion chamber of an internal combustion engine may be increased by incorporating sound absorbing materials and/or chambers coupled to the liquid coolant of said engine.

Further objects of this invention will be obvious from the following description.

BRIEF DESCRIPTION OF THE DRAWINGS

FIG. 1 represents a liquid cooled internal combustion engine and illustrates several locations for transducer mountings for sensing vibrations traversing the cooling system.

FIG. 2 is a partially sectioned view of a piezoelectric transducer mounted in a clamping ring which encircles a cooling system hose.

FIG. 3 is an enlarged partly sectioned view of the electronic portion of the transducer of FIG. 2.

FIG. 4 is an end view of FIG. 3.

FIG. 5 is a perspective view of a piezoelectric disc element showing lead attachment.

FIG. 6 is a perspective view of a piezoelectric cube element showing lead attachment.

FIG. 7 is an electrical schematic for FIG. 3.

FIG. 8 illustrates another form of transducer.

DETAILED DESCRIPTION OF THE PREFERRED EMBODIMENTS

Figure 9:
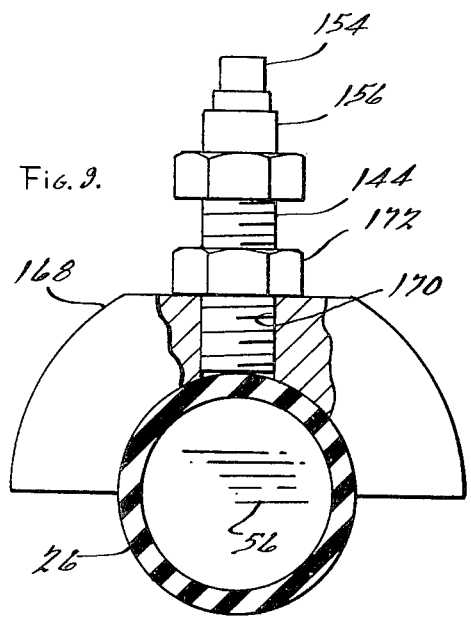
FIG. 9 shows the transducer of FIG. 8 in a ring mount on a hose.

Refering to FIG. 1, the engine block is indicated at 10, the cylinder head at 12, and the crankcase at 14. Parts of the radiator cooling circuit include the water pump 16, lower radiator hose 18, bottom radiator tank 20, radiator core 22, top radiator tank 24, top radiator hose 26 and thermostat housing 28.

Transducer mounting location 30 is suitable for installation of the mounting parts of FIG. 2 or FIG. 9 as will be explained.

The passenger heater circuit includes hose 32, tee 34, the branch of which provides for an alternative transducer mounting location 36, hose 38, wye 40, the branch of which connects to hose 42 at the end of which is further alternative transducer mounting location 44.

Continuing with the heater circuit is hose 46 which connects to the bottom tank of heater core 52. Alternative transducer mounting location 50 is on tank 48 as will be explained in the discussion of FIG. 12. The heater circuit is completed by discharge of the coolant through hose 54 to a low pressure portion of the cooling system.

FIG. 2 illustrates a transducer and mounting parts suitable for installation on top radiator hose 26 at mounting location 30. Hose 26 contains liquid engine coolant 56. Hose 26 is encircled by a split clamping ring comprising halves 58 and 60 which are held together and in tight contact with hose 26 by two screws, one screw 62 is shown. Sleeve 64 is permanently attached to ring half 60 by solder 66. Sleeve 64 and ring half 60 share common bore 68. Sleeve 64 has four axial saw slots 70, two of which are shown, and shallow rectangular groove 72 for receiving a conventional worm screw hose clamp 74.

The transducer comprises cylindrical plunger body 76 to which is soldered flange 78. When clamp 74 is loosened, body 76 is free to slide axially within bore 68. When clamp 74 is tightened, body 76 is firmly held in position by the collet like action of the slotted upper end of sleeve 64. Further, body 76 has an axial internally threaded hole 80 for receiving stud package 82. At the upper end of stud package 82 is screwdriver slot 84 and extending upward, signal lead 86, positive supply lead 88 and ground lead 90. Protruding from the lower end of stud package 82 is teflon foot disc 92. Changes in force on foot disc 92 are translated into electrical signals on lead 86 as will be described later. Disc 92 is made of a material having a low coefficient of friction in order to minimumize lateral forces on the disc making the electrical signal on lead 86 largely responsive only to forces perpendicular to the disc. Stud package 82 is further secured to body 76 by jam nut 94.

When plunger 76 is correctly positioned axially in bore 68 and clamp 74 is tightened, foot 92 bears with a preload force against larger teflon disc 96. Disc 96 bears against that portion of hose 26 which is exposed at the bottom of bore 68. Said portion of hose acts as a diaphragm producing changes in force on foot disc 92 in response to changes in pressure in the engine coolant 56. Attached to flange 78 with screws is metal mini-box 98. The mini-box acts as a shielded enclosure for mounting connectors and for holding a power supply such as Motorola #7808 three terminal integrated circuit voltage regulator which may be used to provide regulated +8 volts to lead 88 upon being connected to a nominal +12 volt supply.

FIG. 3 gives further details of construction of stud package 82. Operational amplifier 100 is located in the lower end of stud package 82 and may be a Motorola #1456 housed in a style TO-5 can. Such an amplifier has leads conventionally numbered #1 through #8 (numbers not shown) which extend upward from a glass seal in the flange of the can. Three ⅛ watt resistors, 102, 104, and 106 are arranged side by side and are appropriately soldered to the amplifier leads and to leads 86, 88, and 90 which are enclosed in shrink tube 108, these soldered connections being in accordance with FIG. 7. Amplifier leads #1, #5, and #8 are cut off just above the glass seal of the TO-5 package as they are not used in this application. Stud 110 has a hole 112 extending through it. A counterbore 114 receives the flange of amplifier 100. Slot 128 in stud 110 intersects the length of counterbore 114 and part of hole 112 to accomodate leads to be described. Referring now to FIG. 5, piezoelectric disc 120 is made of a lead zirconate titinate ceramic and may be Vernitron part number 57002 PZT-5A. Circular surfaces of the disc 124 and 126 are silvered permitting making of soldered connections thereto.

Leads 118 and 122, which may be of #30 magnet wire, are soldered to these circular surfaces.

Returning now to FIG. 3, 0.005" thick polyimide insulating disc 116 is attached to the lower end of amplifier 100 with a thin coat of epoxy. Piezoelectric disc 120, with leads 118 and 122 is then attached to disc 116 with paste epoxy and teflon foot disc 92, with its upper surface severely abraded to insure adhesion, is attached with paste epoxy over lead 122. Thickness of the paste epoxy above and below disc 120 must be such that discs 116, 120 and 92 are substantially parallel and the spaces between them completely filled. This epoxy is cured and leads 118 and 122 are soldered to the appropriate amplifier terminals.

A conformal coating of paste epoxy, shown by dotted outline 130, is placed over resistors 102, 104, and 106 and covering the upper surface of amplifier 100. This coating also covers and protects leads 118 and 122 which must not extend outward beyond the minor diameter of the thread stud 110. Before this coating has cured, the subassembly comprising the leads in tube 108, the three resistors, the amplifier, the piezoelectric disc and the teflon foot is positioned in the hole of stud 110 such that the amplifier flange is seated in counterbore 114. The counterbore 114 and slot 128 are then filled with epoxy which is allowed to cure forming a liquid tight seal at the lower end of hole 112.

As is well known in the accelerometer art, it is important that the high impedance leads in such a circuit be prevented from mechanically responding to vibration; changes in capacitance of these leads resulting from such vibration introduce spurious signals in the output of the amplifier. The lack of consistency and customary lack of precision in placement of electrical leads makes them unsuitable as capacitative microphonic elements. The short lengths employed for the high impedance leads and the rigidity provided by the paste epoxy coating minimumizes high impedance lead vibrations in this design.

To further reduce lead vibration and to provide environmental protection, the hole 112 in stud 110 is filled with a liquid RTV silicone such as Dow Corning's Sylgard #182 which is subjected to a vacuum to remove air bubbles and allowed to cure to an elastomeric state.

In FIG. 7, the leads 86, 88, and 90 which are contained in tube 108 of FIG. 3 are indicated by bracket 136. Resistors 104 and 106 form a voltage divider supplying a reference voltage to the piezoelectric element 120 and to the positive input lead #3 of amplifier 100 via connection 122. To precisely center this reference voltage in the regulated 8 volt supply, i.e. at 4 volts, these two resistors should be of equal value and may be, say, 1000 ohms each. Output conductor 86 attaches to amplifier output lead #6 and to ten megohm feedback resistor 102. The conductor 118 connects the other end of feedback resistor 102 to amplifier negative input lead #2 and to piezoelectric element 120. With no changes in force on element 120, the output on lead 86 is determined by the reference voltage and will be 4 volts. Output voltage excursions about the 4 volt level will be positive or negative depending on whether force is being applied to or released from element 120. Power supply leads to the amplifier are conventionally not shown but connect lead 88 to amplifier lead #7 and from lead 90 to amplifier lead #4.

The only portions of stud package 82 which are appreciably susceptable to electrical interference are the piezoelectric disc 120 and lead 118 as it traverses into slot 128. Dependent on proximity of sources of interference, additional shielding may be desired and may be provided in the mounting of FIG. 2 by placing a strip of soft copper screen (not shown) overlying the radiator hose and beneath larger teflon disc 96 prior to assembling split ring half 60. One end of this strip may be securely grounded by placing it in a joint between ring halves 58 and 60 where it is clamped when screw 62 is tightened.

FIG. 8 shows a transducer in which the piezoelectric element is encapsulated. As best seen in FIG. 6, piezoelectric element 138 is a cube 0.100" on a side and may be Vernitron part #57181 PZT-5A. Two opposite faces of the cube are silvered and leads 140 and 142 of #30 stranded insulated wire are soldered to these faces. These leads should be extremely limp and flexible to minimumize forces which they can transmit to the element.

The main body of this transducer is made of a common steel bolt 144. A hole 146 is drilled through the hex head 150 and almost to the end of the bolt. Counterbore 148 is located in the hexagon head.

Flexible leads 140 and 142 are twisted together as shown. The element, solder joints and lower extremities of the leads are dip coated with a thin conformal coating of epoxy, shown in dotted outline 152, and the epoxy is allowed to cure.

The element is next suspended by the two leads in the position shown in hole 146 and the hole is filled with liquid Sylgard #182 silicone elastomeric encapsulant 166. The assembly is subjected to a vacuum to remove entrapped air and the liquid is allowed to cure.

Conventional phono jack connector 154 is threaded into metal cap 156. A short piece of #20 solid copper wire 158 is soldered into a hole in cap 156 at 160 to serve as a ground connection. Lead 142 is soldered to wire 158 and lead 140 is soldered to the insulated terminal 162 of the phono jack. The lower outside diameter of cap 156 including groove 164 is coated with epoxy and is seated in counter bore 148 using care not to pinch either of the flexible leads. The epoxy is allowed to cure. Then, using a syringe through the central hole of phono jack 154, the space above the Sylgard encapsulant and below the phono jack is filled with DC-4 silicone grease to provide protection against moisture and to dampen vibrations of the unsupported segments of the two leads.

FIG. 9 illustrates another mounting suitable for use at the radiator hose location 30 of FIG. 1. Half ring 168 together with another half ring, not shown but identical to 58 of FIG. 2, encircle and are clamped to radiator hose 26 with screws as in FIG. 2. Half ring 168 includes a threaded hole 170 suitable for receiving the bolt transducer of FIG. 8 which is further secured in the position shown by jam nut 172. Sonic vibrations in the engine coolant 56 are transferred through the radiator hose to the split ring, through the thread engagement to the steel of bolt 144, thence to the silicone encapsulant, and to the contained epoxy coated piezoelectric cube which produces a corresponding output signal at phono jack 154.

In the mechanical mountings of FIGS. 2 and 9 the mass of the split ring as it is suspended on the springiness of the rubber radiator hose, together with the lack of low frequency response of the piezoelectric element, which is due to its stiffness and the small coupled mass, effectively eliminates much of the background noise of normal engine operation from the transducer output, while the vibrations of detonation are clearly transmitted through the wall of the radiator hose to the piezoelectric element via the engine coolant.

Figure 10:
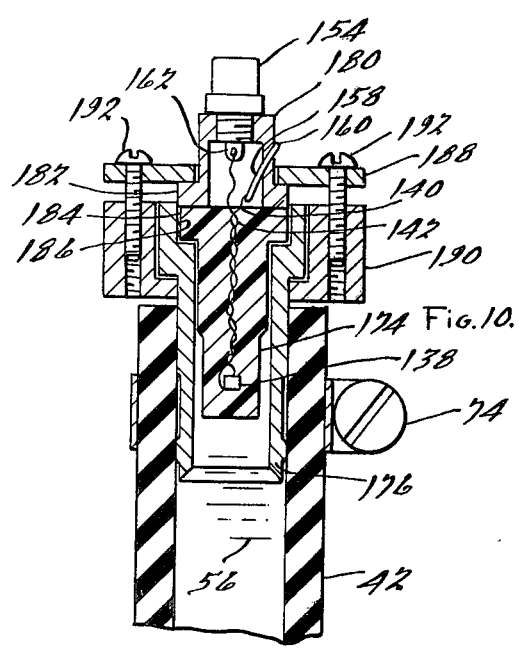
FIG. 10 is a sectioned view of still another transducer and a mounting at the end of a hose.

The transducer of FIG. 10 is suitable for mounting in a heater hose as, for example, at locations 36 or 44 of FIG. 1. A number of parts and features here are similar to the transducer of FIG. 8 and bear like identification numbers. In this transducer, piezoelectric cube 138 and leads 140 and 142 are moulded into a rubber part 174 which may be Dow Corning #3112 RTV encapsulant and surfaces of the rubber part are exposed directly to engine coolant 56. Hose fitting body 176 is inserted in hose 42 where it is held by hose clamp 74. The upper portion of rubber part 174 is made as a flange 184. Counterbore 186 in hose body 176 receives flange 184. Counterbore 186 is slightly deeper than the thickness of flange 184. Diameter 182 of cap 180 enters counterbore 186 securely clamping flange 184 as force is applied by tightening screws 192 which engage upper clamping ring 188 and lower clamping ring 190 thus providing a leak proof seal as the rubber of flange 184 is compressed.

Figure 11:
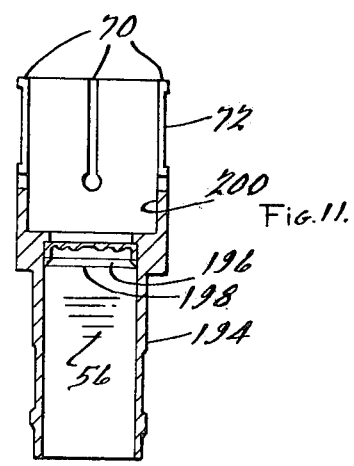
FIG. 11 is of an alternative mounting for the transducer of FIG. 2 suitable for mounting at the end of a hose.

In FIG. 11, the brass hose body mounting 194 is intended for hose mounting locations the same as the transducer of FIG. 10. Bore 200 of hose body 194 is adapted to receive cylindrical plunger body 76 of the FIG. 2 transducer. The hose clamp 74 of FIG. 2 may be loosened and body 76 withdrawn from bore 66. This withdrawn assembly may then be installed in bore 200 of FIG. 11. Convoluted diaphragm 196 is made of 0.005" thick berillium copper alloy and is soldered into brass hose body 194 as indicated at 198 forming a leak tight seal confining engine coolant 56 to the lower portion of body 194. The upper portion of body 194 is adapted with saw slots 70 and hose clamp groove 72 to act as a collet griping body 76 in a position such that teflon foot disc 92 is lightly preloaded against diaphram 196.

In the mountings of FIG. 11 and FIG. 2, in order to test for spurious signals which are not introduced through teflon foot 92, the collet hose clamp may be loosened and body 76 slightly withdrawn so that foot member 92 is not in contact with the diaphrage and the hose clamp tightened, holding the body in this position. Signals with this arrangement may arise from such sources as lead vibration or electrical interference and are small.

Figure 12:
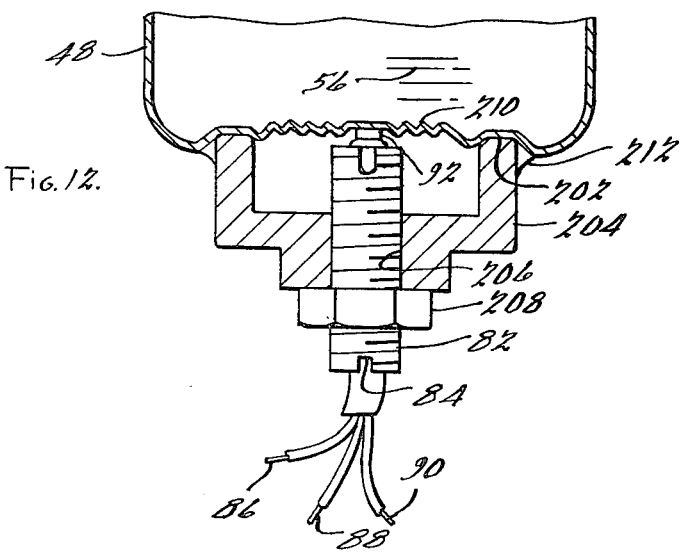
FIG. 12 is a partly sectioned view of still another transducer mounting.

In FIG. 12, the heater core bottom tank 48 of FIG. 1 is shown in enlarged sectioned fragmentary view containing engine coolant 56. These tanks are customarily drawn of thin sheet brass and, in this design, a special pattern has been embossed. This pattern comprises a circular depression 202 into which metal cup member 204 is soldered as indicated at 212. Depression 202 encircles circular convoluted diaphragm portion 210. Cup 204 has an internally threaded hole 206 for receiving stud package 82 of FIGS. 2 and 3. Stud package 82 is threaded into hole 206 so that teflon foot disc 92 is lightly preloaded against a small flat circular area at the center of diaphragm portion 210. The stud package is secured in this position by jam nut 208. Leads 86, 88 and 90 may be terminated in a connector, be formed into a wiring harness or pigtail, or be connected to other electronic components which may be mounted on or adjacent cup 204. Although this heater core location is preferred since it is in a clean dry location, the transducer package 82 may also be mounted similarly on a surface of the radiator core.

Signal output lead 86, being connected to output lead #6 of operational amplifier 100 has substantially infinitely low output impedance and no special care need be taken to prevent vibration of this lead after it emerges from stud package 82; further, this lead in short lengths, is reasonably insensitive to electrical pickup from vehicle sources such as an ignition system or alternator wiring.

In contrast, those transducers illustrated as being terminated in phono jacks 154 are subject to problems associated with the high impedance of leads 142 which are connected to insulated terminals 162 of the phono jacks. Conductors connected to terminals 162 must be carefully shielded against electrical interference, should be secured against vibrations which would change their distributed capacitance and should be as short a length as possible. Consequently, it is recommended that, in application of these transducers, that an amplifier circuit such as shown in FIG. 7 be located immediately adjacent the transducer in an electrically shielded enclosure as mini-boxes 98 which may carry a male phono jack connector and be mechanically clamped to the outside diameter of the cap part of the transducer immediately beneath phono jacks 154 by obvious means.

It is also obvious to one skilled in the art that an amplifier circuit as shown in FIG. 7 may be packaged more intimately with any of the above designs illustrated having a phono jack 154.

It is important that air pockets or bubbles do not accumulate in the engine coolant so as to interrupt liquid continuity from the engine water jacket to the transducer location. To prevent this, as shown in FIG. 1 at location 36, the branch of tee 34 points downward so that any gas bubbles in the branch will rise to be swept away by the pumped coolant flow to be subsequently vented by the radiator cap. Similarly, for FIG. 1 location 44, which might be in a vehicle passenger compartment, the run of hose 42 rises smoothly to wye 40.

In order to emphasize to a sensor location a certain frequency which may be of particular diagnostic interest, the length of a cooling system member such as hose 42 in FIG. 1 may be adjusted to be, say, a ½ wavelength stub which will be excited into resonance by that frequency. The length may be approximated by a simple calculation, say, for a frequency of 5000 hertz and a sonic velocity in water of 4,794 feet/second produces a wavelength of 0.958 feet, half of which equals 0.479 feet. The exact length required is best finally determined experimentally due to the complex structure of the source. In order to keep such a resonant stub from ringing on into a subsequent time period in which diagnosis of another combustion may be required, it may be necessary to insert damping in the system, as will be described later. Other resonant lengths and structures are of course possible as is well known in the art of acoustics.

Detonation is not completely understood in the present state of the art of combustion processes. It is said that it is an instantaneous burning of at least a portion of the charge in a combustion chamber. Perhaps the chemical process propagates at close to the speed of light—in any event, it is sufficiently fast to have defied measurement of its speed of propagation.

A relevant mathematical concept is that of a step function. The relevant portion of this concept is that the energy in such a fast release may excite all of the various resonant frequencies of all objects receiving the energy.

In a similar sense, detonation powerfully excites ringing or resonances of the combustion chamber containment structure which are not as swiftly or as powerfully excited during normal engine operation. This produces the characteristic pinging sound.

Detecting these vibrations, diagnostic of a single detonation, while the engine is running is made difficult because they are mixed with vibrations from other sources. Detection of a signal in noise is made easier if the precise characteristics of the signal are known. For example, in U.S. Pat. No. 4,116,173, mentioned previously, the bandpass filter 226 of FIG. 6 can be more effective if constructed to pass only those frequencies which are known with certainty to be diagnostic of detonation.

Figure 13:
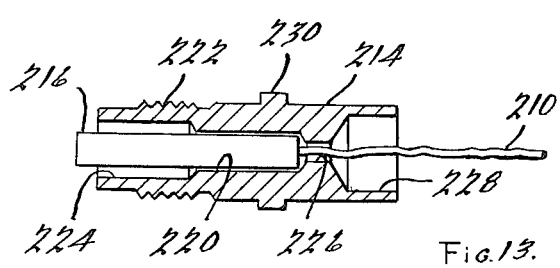
FIG. 13 is a section view of an explosive device for simulating a step function in a cylinder of a spark ignited internal combustion engine.

To simulate a step function representative of detonation in the combustion chamber of an engine while the engine is not running and is otherwise quiet, the explosive device of FIG. 13 has been constructed. Body 214 is made of steel and includes hex portion 230 and 14 millimeter thread 222 for threading the body into a tapped spark plug hole of an internal combustion engine. Bore 220 receives ordinary 1½ inch fire cracker 216 with a finger press fit. Touch hole 226 accomodates fuse 210 and is of sufficient diameter to permit burning of the fuse there through but small enough so that the amount of gas which may escape through it when the fire cracker explodes is inconsequential. Bore 228 protects the fuze during socket wrench installation of the device in an engine. Bore 224 permits explosion of the fire cracker in the combustion chamber yet retains most of the resulting paper fragments for removal when the device is removed from the engine.

In use, the explosive device may be inserted instead of the spark plug into the cylinder to be pulsed, the piston of that cylinder is positioned to the desired crank angle with valves closed. A conventional recording apparatus is connected to the output of the transducer to be tested as it is mounted in the location to be tested and the recording apparatus is started. The fire cracker is lit and the resulting output of the transducer immediately following the explosion is recorded.

A more convenient device for repetetive testing could be devised by increasing the gap of a conventional spark plug and arranging a capacitor bank charged to say 10,000 volts to fire a spark of, say, 1 joule energy across the enlarged spark plug gap. The effect of this high energy spark in the combustion chamber should have an effect similar to the fire cracker discharge and would not require removal of the spark plug for re-loading.

Figure 14:
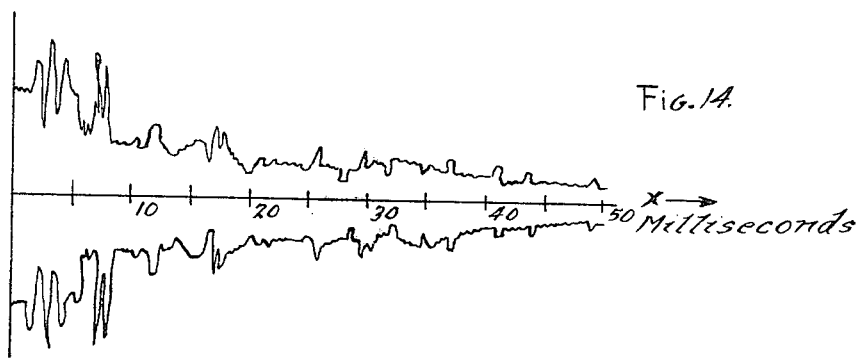
FIG. 14 is a graph of the envelope of a recording of the output waveform of a transducer in response to an explosion of the device of FIG. 13.

FIG. 14 is an idealized graphical representation of the envelope of a recording of the voltage output of the transducer and mounting of FIG. 2 in mounting location 30 resulting from an explosion by the device of FIG. 13. The explosion was in the #4 cylinder of a 4 cylinder engine with the piston stationary at top dead center on the compression stroke. Horizontal or "x" axis graduations represent 5 milliseconds each. The vertical or "y" axis scale of this graph and the graph of FIG. 15 are dependent on arbitrary recorder gain settings.

Note the lengthy time for the reverberations to die out. For example, a four cylinder four stroke cycle engine running at 3000 RPM fires once every 10 milliseconds. It is apparent that, particularly at moderate and higher engine speeds, that the time period in which a detonation signal may occur from one cylinder of an engine may be cluttered with reverberations resulting from detonations from previous firings. Further, reverberations from other engine noise sources, particularly from valve closures, also tend to mask and interfere with detection of the diagnostic vibrations sought.

Figure 15:
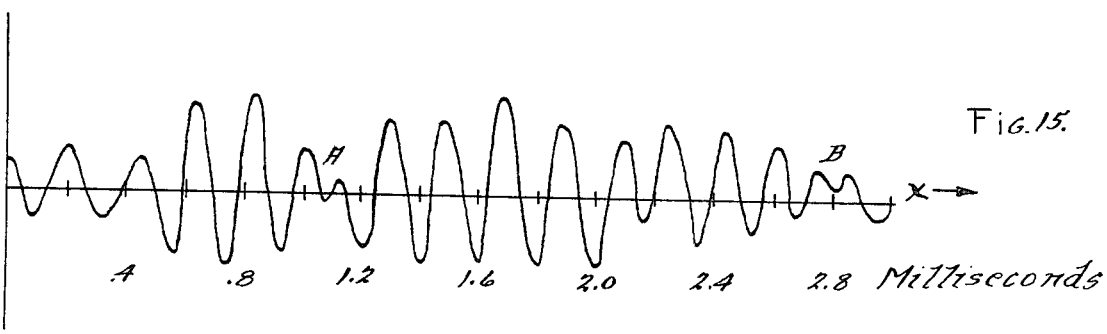
FIG. 15 is an early portion of FIG. 14 on an enlarged time scale.

FIG. 15 is an expanded graph of an early portion of the graph of FIG. 14 to an "x" axis scale of 0.2 milliseconds per graduation. The dominant frequency appears to have a period of approximately 0.2 milliseconds or a frequency of 5000 Hertz. The cast iron cylinder block of this four cylinder engine is approximately 20 inches or 1.666 feet long. Twice this length, or the distance a vibration would travel to traverse from one end of the block to the other and return is 3.333 feet. The sonic velocity in iron is 16,410 feet per second. If we divide 16,410 by 3.333, we obtain 4,923 Hertz which corresponds closely with the 5,000 Hertz dominant frequency of the graph; it appears that this dominant component of the signal is the natural or resonant frequency of the cylinder block.

The sonic velocity in the aluminum cylinder head is 16,740 feet per second, very close to the 16,410 feet per second for iron. Due to the greater stiffness of the iron, the block is probably the dominant factor in determining the natural frequency of the assembly.

Also with regard to FIG. 15, the distance as measured by a flexible tape measure from the rear of the cylinder block to the center of the radiator core is approximately 48 inches or 4 feet. The dual path period is 2×4=8 feet divided by the sonic velocity in water of 4,794 feet per second or 0.00167 seconds or 1.67 milliseconds. As the disturbances in the water and in the iron commence at approximately the same time, the two disturbances, at least initially, should be in phase. The points on FIG. 15 marked "A" and "b" are about 1.7 milliseconds apart and may represent the disturbance induced in the water path by the initial step function. The dominant 5000 Hertz frequency is not, strictly speaking, a reverberation of the coolant, but is a response of the coolant to a tightly coupled forcing function and this forcing function is the reverberation of the block as the block continues to respond to the intial step function.

The primary acoustical energy sinks providing damping of engine vibrations are believed to be the hysterisis in the cast iron material of the cylinder block and coupling of vibrations to the atmosphere. A significant increase in damping may be obtained by coupling silencing materials and structures to the engine cooling system. This not only permits more certain identification of diagnostic vibrations but also reduces objectionable noise coupled to the atmosphere.

Silencers useful in the cooling system of a liquid cooled internal combustion engine may take many forms and may be placed in many locations obvious to those skilled in the acoustics art.

Figure 16:
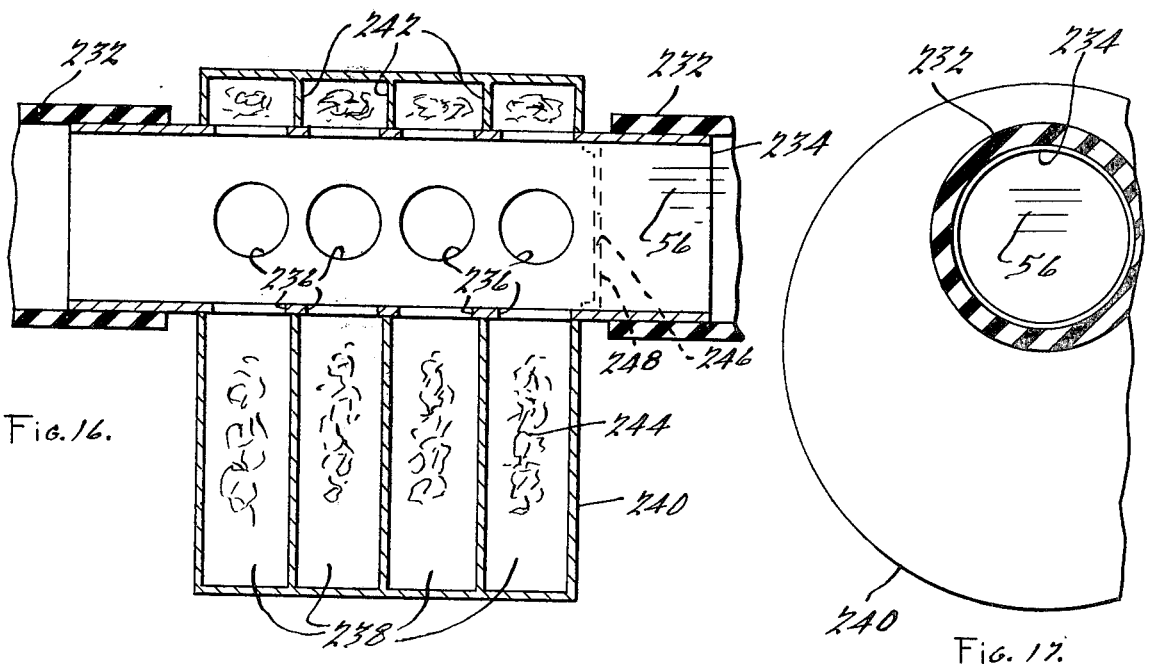
FIG. 16 is a section view of a silencing device for damping vibrations in the cooling system of an internal combustion engine.
Figure 17:
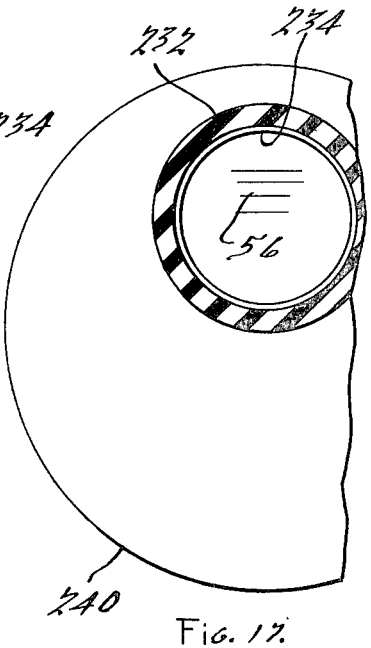
FIG. 17 is a fragmentary end view of FIG. 16.

The silencer of FIG. 16 is adapted to be placed in line in a hose 232 of the cooling system. Tubular member 234 fits the hose at either end and has holes 236 which communicate with chambers 238 which are formed in water tight case 240 by partitions 242. Chambers 238 are filled with sound absorbing material which may be, for example, packed fibrous material such as fiberglass or bronze wool or open cell urethane foam.

The silencer of FIG. 16 may be of small size and used to quiet an isolated chamber or stub of the cooling system in which a transducer is located such as hose 42 of FIG. 1. In such an application, an orifice or restriction 246 shown in dotted plate 248 may optionally be useful in further isolating acoustically the chamber or stub to which the left end of the silencer may connect.

Alternatively, the silencer may be of a larger size so as to place a significant acoustic load on the entire vibrating system and may be located with a larger aperture to the cooling system as may be afforded by placement in a radiator hose for example. The greater acoustic load placed on the system, the greater will be the auxiliary benefit in reduction of noise which is radiated to the atmosphere.

Due to the tight acoustical coupling between the rigid engine structure and the cooling system, damping or silencing reverberations in the cooling system promptly reduces reverberations in the rigid structure. This can result in signal to noise ratio improvement of even the more conventional detonation sensors which may be mounted on the rigid structure of the engine.

A fundamental advantage of such a silencer in distinguishing diagnostic vibrations is that, reverberations, being back and forth reflections of sound, may be made to transit the silencer many many times and to suffer an attenuation in amplitude upon each transit with the result that reverberations are rapidly reduced. The transducer may be located, either so that the diagnostic vibrations reach the transducer without having to pass through the silencer at all, or so that they only have to pass through once, suffering, initially respectively either no attenuation, or a small attenuation resulting from the single transit.

Other forms and advantages of the teaching of this invention will be obvious to those skilled in the art. It is to be considered limited only by the subjoined claims.

What is claimed is:

1. For an internal combustion engine having a liquid coolant supply for cooling said engine, a combustion condition sensing system comprising:
   passage means communicating with said engine for containing said coolant, said passage means extending away from said engine to provide a portion which is remote from said engine and being at least in part elastomeric to isolate said remote portion from substantial direct vibrations of said engine,
   a vibration sensor which is responsive to vibrations indicative of said combustion condition; and
   mounting means for mounting said vibration sensor on said remote portion of said passage means so that said vibration sensor is in vibration communication with said coolant for sensing vibrations transmitted through said coolant from said engine but is isolated from substantial direct vibration of said engine.

2. A combustion condition sensor according to claim 1 wherein said vibration sensor is a pressure transducer in pressure communication with said coolant.

3. A combustion condition sensor according to claim 2 wherein said vibration sensor includes a diaphragm interposed between said coolant and other parts of said pressure transducer.

4. A combustion condition sensor according to claim 1 wherein said vibration sensor includes a piezoelectric element in vibration communication with said coolant.

5. A combustion condition sensor according to claim 4 including a elastomer interposed between said coolant and said piezoelectric element.

6. A combustion condition sensor according to claim 5 wherein said piezoelectric element is encapsulated in said elastomer.

7. A combustion condition sensor according to claim 1 wherein said remote portion of said passage means has a closed end.

8. A combustion condition sensor according to claim 1 wherein said passage means includes a heat exchanger.

9. A combustion condition sensor according to claim 8 wherein said heat exchanger has a wall in communication with said coolant and said mounting means includes said wall of said heat exchanger.

10. For an internal combustion engine having a liquid coolant supply for cooling said engine, a combustion condition sensing system comprising:
    passage means communicating with said internal combustion engine containing said coolant and having a closed end, said passage means having a length which is predetermined in accordance with the frequency of vibrations which are indicative of a detonation of a charge in said engine;
    a vibration sensor which is responsive to vibrations indicative of said combustion condition; and
    mounting means for mounting said vibration sensor on said passage means remote from said engine but in vibration communication with said coolant for sensing vibrations transmitted through said coolant from said engine.

11. For an internal combustion engine having a supply of a liquid coolant for cooling said engine, a combustion condition sensing system comprising:
    an elastomeric hose providing a coolant passage communicating with said internal combustion engine for containing said coolant and having a portion which is remote from said engine;
    a vibration sensor which is responsive to vibrations indicative of said combustion condition; and
    mounting means mounting said vibration sensor on said remote portion of elastomeric hose so that said vibration sensor is in vibration communication with said coolant for sensing vibrations transmitted through said coolant and so that said elastomeric hose isolates said vibration sensor from direct vibrations of said engine.

12. A combustion condition sensor according to claim 11 wherein said vibration sensor is a pressure transducer in pressure communication with said coolant.

13. A combustion condition sensor according to claim 12 wherein said vibration sensor includes a diaphragm interposed between said coolant and said pressure transducer.

14. A combustion condition sensor according to claim 11 wherein said vibration sensor includes a piezoelectric element in vibration communication with said coolant.

15. A combustion condition sensor according to claim 14 including a elastomer interposed between said coolant and said piezoelectric element.

16. A combustion condition sensor according to claim 15 wherein said piezoelectric element is encapsulated in said elastomer.

17. For an internal combustion engine having a supply of a liquid collant for cooling said engine, a combustion condition sensing system comprising:

an elastomeric hose providing a coolant passage communicating with said internal combustion engine for containing said coolant and having a portion with a closed end;

a vibration sensor which is responsive to vibrations indicative of said combustion condition; and mounting means mounting said vibration sensor on said closed end portion of said elastomeric hose so that said vibration sensor is in vibration communication with said coolant for sensing vibrations transmitted through said coolant and so that said elastomeric hose isolates said vibration sensor from said engine.

18. A combustion condition sensor according to claim 17 wherein said closed end portion has a length which is predetermined in accordance with the frequency of vibrations indicative of a detonation of a charge in said engine.

19. For an internal combustion engine, a combustion condition sensing system capable of sensing a vibration condition comprising:

a vibration sensor which is responsive to vibrations indicative of said vibration condition; and passage means interposed between said vibration sensor and said engine and containing a liquid for transmitting vibrations from said engine to said vibration sensor, said passage means including attenuating means for attenuating vibrations of at least one predetermined frequency and for transmitting vibrations of at least another predetermined frequency.

20. For an internal combustion engine having a coolant supply passage communicating with said internal combustion engine for containing a liquid coolant for cooling said engine, the improvement comprising:

attenuating means in said coolant passage for attenuating vibrations of at least one predetermined frequency to a greater extent than vibrations of at least another predetermined frequency;

vibration sensing means which is responsive to vibrations of said at least another predetermined frequency for indicating a combustion condition; and mounting means for mounting said vibration sensor or said coolant passage in communication with said attenuating means for sensing said vibrations of said at least another frequency.

21. A method for testing an internal combustion engine having a sensor for detecting a vibration characteristic of the combustion of a charge in a combustion chamber of said engine comprising the steps of:

generating a pressure impulse in a combustion chamber of said engine while the engine is not operating; and evaluating the vibrations received by said sensor as a result of said pressure impulse in the absence of the normal vibrations created by said engine when said engine is operating.

22. The method of claim 21 further including the steps of:

generating a pressure impulse in a combustion chamber of said engine while the engine is operating; and evaluating the vibrations received by said sensor as a result of said pressure impulse generated during the operation of said engine and comparing the vibrations received by said sensor when the engine is not operating with the vibrations received by said sensor when the engine is operating.

23. The method of claim 21 wherein said pressure impulse is generated by exploding a charge in said combustion chamber.

24. The method of claim 23 wherein said charge is a substance other than the fuel for said engine.

* * * * *